Feb. 29, 1944.    F. P. BIERET    2,342,998
APPARATUS FOR PRESERVING PERISHABLE PRODUCTS
Filed March 31, 1941
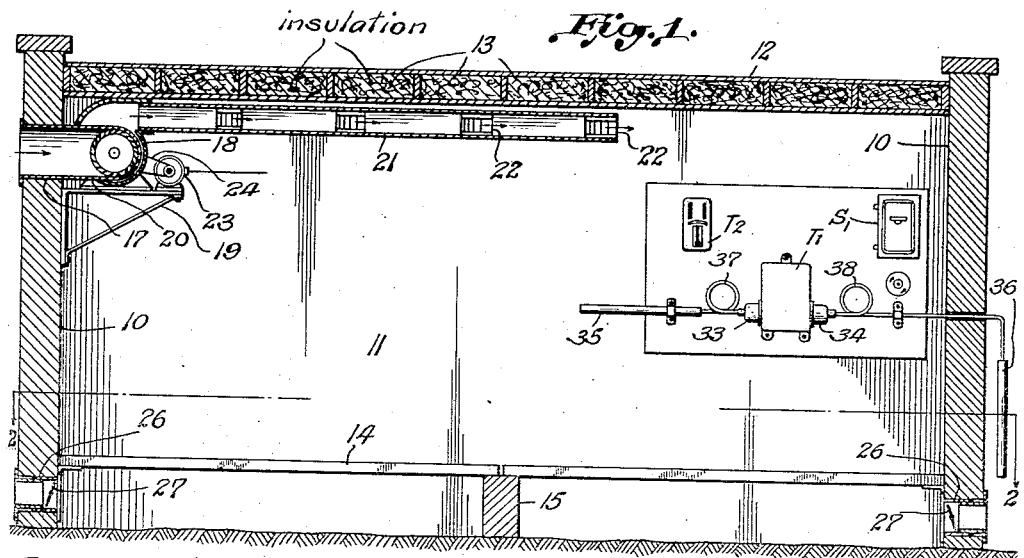
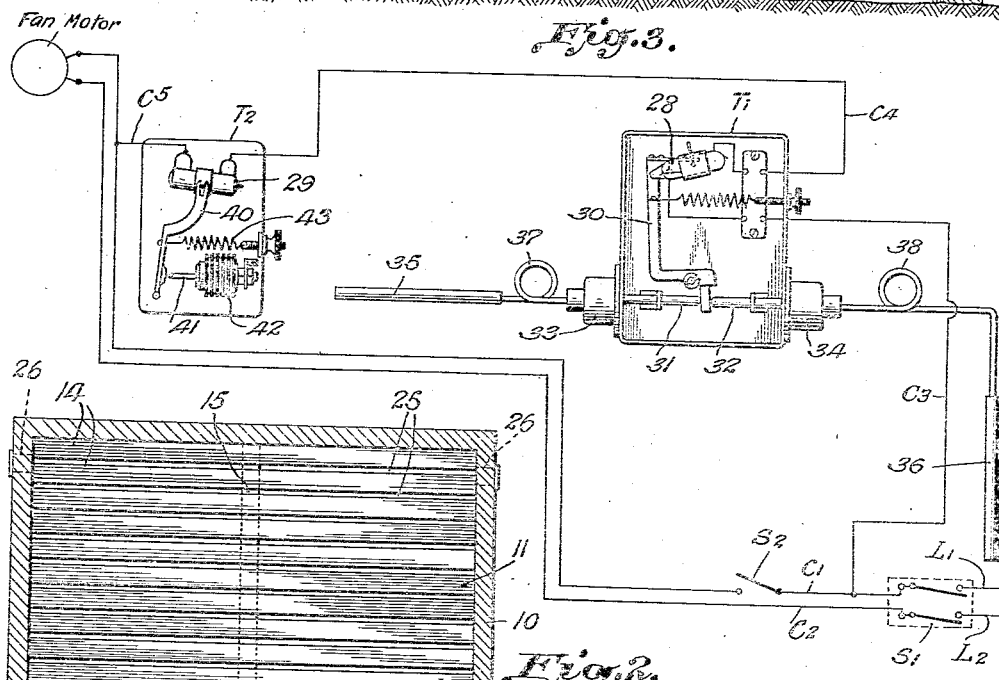
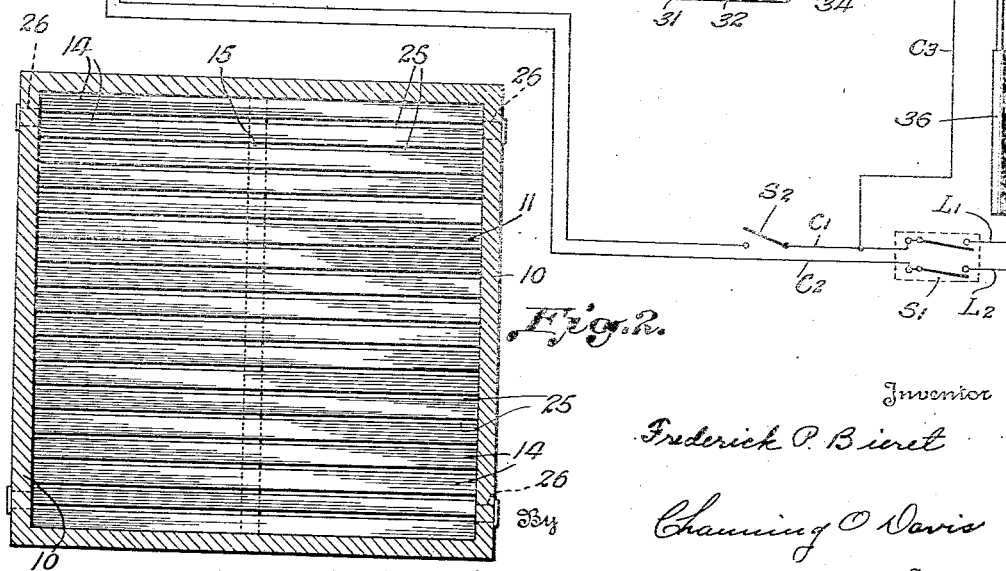
Inventor
Frederick P. Bieret
By Channing O. Davis
Attorney Patented Feb. 29, 1944

2,342,998

UNITED STATES PATENT OFFICE 2,342,998

APPARATUS FOR PRESERVING PERISHABLE PRODUCTS

Frederick P. Bieret, Allentown, Pa.

Application March 31, 1941, Serial No. 386,138

2 Claims. (Cl. 99—271)

The invention relates to the preservation of fruits, vegetables and other perishable foods in store rooms or other chambers for the purpose of maintaining such foods in proper condition during the period between harvest and use or sale. More particularly the invention is concerned with a novel method of conditioning such storage chambers for the purposes mentioned, which is superior to available prior methods in that it may be practiced with greater economy of power and equipment, and the invention also includes new and simplified apparatus by which the method may be advantageously practiced.

Fruits, vegetables and other perishable products are usually harvested in the Fall of the year, at which time they are placed in storage where they are kept until Spring. Storage chambers available to the average grower usually consists of a room built either below the ground surface in an endeavor to obtain the proper conditions of temperature and moisture, or built in the open, above ground, for the purpose of obtaining a good circulation of air about the outside of the room. Although the average mean temperature of the atmosphere during the months of storage is low, and well within the range necessary for proper preservation, it has been found that, especially, where large volumes of such products are stored, the temperature, during certain periods, within either type of storage room becomes considerably above that at which the products may be preserved. This increase in temperature is due to two causes, first, in the case of the underground room, the temperature is raised and maintained well above the preservation point by the heat transferred to the room by the surrounding earth which has a normal temperature usually above that at which food may be preserved plus the heat given off by the stored products, and second, in the case of the storage chambers built above ground, a combination of the heat given off by the products and that absorbed and trapped within the room during the hotter portions of the day. It has further been found that certain gases given off by the stored products, when allowed to accumulate within the room, to a substantial degree of concentration, results in a deterioration of the stored material usually in the form of burns and scalds which materially reduce the market value of the products.

In order to protect his products the grower is usually forced to haul them to central cold storage plants where the temperature, moisture and purification of air is maintained at the proper preserving conditions by circulating the air in a desired manner over refrigeration coils and humidifiers. In addition to being forced to haul the products to such plants, the grower must pay for the storage space according to the length of time the products are stored, this payment materially reducing the potential profits of the grower.

Various attempts have been made heretofore to preserve products during the period between harvest and Spring in the store rooms available to the grower at his farm, but have been unsuccessful. In one prior art construction a funnel placed at the end of a duct leading to the storage room is utilized to direct fresh air to the room. In this type of apparatus the funnel is pivoted, and operates on the weather vane principle so as to face the funnel in the direction of any air current or wind, thus the pressure of the wind causes the air received by the funnel to travel through the duct to the storage room. Such a system of preserving the stored products has a number of disadvantages, the most important of which is the conduction of air to the storage room at times when the outside air temperature is greater than that inside the room, thus raising the temperature, at times, to a point where deterioration will take place. A further disadvantage in a system of this type is its failure to eliminate gases given off by the products.

In another form of the prior art the air used to preserve the products is caused to flow into the chamber at the bottom through suitable openings, a chamber above the storage chamber causing a natural draft to draw the air into and through the room. In this system the air is drawn into the storage room regardless of existing outside temperatures, thus at times the temperature of the incoming air is too low for proper preservation of the products, and at other times the products are subjected to air the temperature of which is too high.

The present invention is, accordingly, directed to the provision of a novel method and apparatus by which fruits, vegetables and other perishable products may be preserved in storage chambers for periods under the proper conditions of temperature and air purification at low cost to the grower. In the practice of the method the products are placed in a suitable storage chamber, usually constructed for this purpose, and insulated from the surrounding atmosphere. Under predetermined conditions, in which the outside temperature is lower than the inside temperature, the outside air is forced into the chamber where it is dispersed to lower the temperature therein, such forcing of this additional air into the chamber, also raising the pressure within the chamber. The increased pressure acts to force the destructive gases usually accumulated near the bottom of the chamber through suitable outlets provided for this purpose. During the storage period the outside temperature will frequently be lower than that inside at which time the cycle of air conditioning will take place, and occasionally it will happen that the outside temperature reaches a point below a safe limit to which the products may be subjected. Under such conditions the flow of cold air to the storage chamber is automatically limited to such quantity of air necessary to bring the inside temperature down to a predetermined minimum.

For a better understanding of the invention, reference may be had to the accompanying drawing in which is illustrated one form of the apparatus suitable for the practice of the new method.

Fig. 1 is a view, partly in end elevation and partly in section through a storage chamber of the invention.

Fig. 2 is a schematic diagram of the electric circuits with parts in detail for purpose of illustration.

Fig. 3 is a sectional view taken on line 3—3 of Fig. 1.

The apparatus illustrated in the drawing comprises a storage building of one room having side walls 19, end walls 11, and a roof 12. The side walls may be of any desired construction and are preferably of a material adapted to insulate the interior of the building from the weather, the roof 12 being provided with insulation 13 in order that the direct rays of the sun will have a minimum effect upon the temperature maintained within the room. Other types of roof and wall structures may be used which have the necessary insulating function. A floor 14, supported at 15, constitutes the bottom of the storage chamber, the floor being spaced a short distance above the ground level 16 to afford a space therebetween for a purpose to be explained later.

An inlet opening 17 in one wall connects the interior of the room with the atmosphere, the room being otherwise substantially air tight. The intake side of a blower 18 which may be of the usual centrifugal type, is connected to the opening 17 by a duct 20, the outlet side of the blower being connected to a duct 21 having a plurality of outlets 22 positioned at desired locations along its length. A motor 23 drives the blower through belt 24 to draw air from the surrounding atmosphere into the room at predetermined periods as will be later described, the blower 18 together with the motor 23 being supported at the desired position relative to the opening on a support 19.

The floor, as more clearly shown in Fig. 3, is constructed in a manner to leave substantial openings 25 between each board, these openings directly connecting the room with the space therebelow. In practice the products are usually stacked in rows upon the floor, leaving clear air spaces between each row. The moisture naturally present in the earth below the floor permeates the storage chamber, entering through the openings 25, and is helpful to maintain the proper humidity conditions in the room. The moisture contained in the atmosphere during the period of the year that the products are stored is usually below that at which the produce is properly maintained, therefore the additional moisture from the earth is necessary to make up for the deficiency, and under extreme conditions it may be desirable to cause the incoming air to flow over pans filled with water. The various gases given off by the produce, an example of which is $CO_2$, are heavier than the air and will settle through the openings, and accumulate in a concentrated form in the space between the floor and the ground.

The walls of the chamber are provided with a plurality of outlet ports 26, usually positioned below the floor level, the outlet ports being normally closed by pivoted dampers 27 which open outwardly, only, to permit the passage of air or gas from the structure under predetermined conditions.

From the apparatus thus far described it will be seen that upon operation of the blower, the surrounding air from the atmosphere is drawn into the room, and as the room is substantially airtight the pressure therewithin will be raised. Blowers of the usual centrifugal type will develop pressures from 4 to 9 pounds without difficulty, but in the present case such increase in pressure is not required as the dampers are regulated to open upon development of a small differential. Under these conditions for example, the air is drawn in, dispersed by the plurality of openings in the duct 21, and is forced from the room through the openings in the floor and out again to the atmosphere through the outlet ports 26. The movement of the air downwardly through the floor openings and out through the outlets 26 purifies the air in the chamber and the gases present in the chamber or which may have accumulated in the space below the floor are forced out through the outlet ports.

In order that the temperature within the room may be properly maintained, the operation of the blower is controlled as follows. Power lines L1, L2 are connected to lines C1, C2 of the motor circuit by a master switch S1. A normally open auxiliary switch S2, in the line C1, is adapted to complete the circuit to the motor and may be operated to by-pass the automatic controls now to be described. With the switch S2 in its normally open position the circuit to the motor is completed, under certain pre-determined conditions, through line C3 tiltable mercury tube 28 of a differential thermostat T1, line C4, tiltable mercury tube 29 of a low limit thermostat T2 and the line C5. The position of the tiltable mercury tube 28 is dependent upon the relative temperatures of the air on the inside of the room and the outside atmosphere, and is carried by a pivoted arm 30 operated to open and closed position by the rods 31 and 32. These rods are connected to diaphragm (not shown) within the diaphragm chambers 33 and 34, and gas filled tubes 35 and 36, one positioned within the chamber and one outside of the chamber, in the atmosphere, are connected to the diaphragm chambers 33 and 34 respectively by pipe lines 37 and 38. It will thus be obvious that the temperatures to which the two gas filled tubes are subjected will be reflected in the position of the rods which control the position of the mercury tube 28. As an illustration, when the temperature within the room rises above that outside, the pressure exerted by the gas in the tube 35 will be greater than that exerted by the gas in the tube 36 thus causing rods 31 and 32 to move to the right and tilt the mercury tube as shown in the drawing. In such position the circuit is completed to the line C4.

It is not always desirable to draw the outside air into the room when the outside air temperature falls below that existing inside, for example when the inside temperature is already at the lowest desirable point. To insure against operation of the blower under such a condition, or to halt operation of the blower when a predetermined low temperature is reached within the chamber, the circuit C4, C5, is adapted to be completed through tiltable mercury tube 29 of the low limit thermostat T2. The position of the tube 29 is determined by the position of the pivoted support 40 which is in turn controlled in its movement by a rod 41 carried by a gas filled bellows 42. Through suitable means such as the spring 43 the low limit thermostat may be set to operate the mercury tube to open and closed position at any desired temperature, thus when the temperature within the room reaches the permissible low point, the pressure exerted by the gas in the bellows is overcome by the spring and the circuit is broken, this position being shown on the drawing. At any time that it is desired to operate the system regardless of the relative conditions of the air inside and outside of the room, the switch S2 may be used to connect the motor 23 directly to its source of power.

Operation of the system is extremely economical and requires little or no supervision. Under the temperatures which exist during the storage period, the temperature within the chamber is lowered to the desired point during each relatively cold period, at which time the destructive gases are carried away. During the hotter part of the day the temperature within the chamber may rise somewhat, but due to the insulation this rise does not exceed the permissible limit before another cold period is reached. It will thus be seen that with a minimum of expense the grower is able to keep his products handy and at the same time in perfect condition.

I claim:

1. A storage system for preserving fruits, vegetables, and other perishable products, comprising a chamber, means to insulate the chamber from the surrounding atmosphere, a fan having its intake connected to the atmosphere to draw air into the chamber, a motor drivingly connected to the fan, a pervious floor in the chamber upon which the products are stacked, said floor being spaced a substantial distance above the bottom of the chamber to leave a space therebeneath, a differential thermostat having means to measure the inside and outside temperatures and adapted to connect the motor to its source of power, at times when the outside temperature reaches a point below the inside temperature, to draw the colder air into the chamber thereby lowering the temperature and raise the pressure therein, a low limit thermostat in the power circuit to the motor, said low limit thermostat operating at times when the outside temperature falls below a safe preserving temperature for the products stored to disconnect the motor from its source of power at a predetermined inside temperature, outlet ports in the wall connecting the space below the floor to the outside, a differential pressure responsive exhaust valve means located in each said outlet port, said valve means being normally closed and constructed and arranged to open in response to a relatively small pressure differential caused by a greater static pressure head within said chamber than outside thereof whereby certain undesirable portions of the atmosphere therein may be exhausted and means holding said valve closed should a greater static pressure head exist outside said chamber than within said chamber.

2. A storage system for preserving fruits, vegetables, and other perishable products, comprising a chamber, a fan having its intake connected to the atmosphere to draw air into the chamber, a motor drivingly connected to the fan, a pervious floor in the chamber upon which the products are stacked, said floor being spaced a substantial distance above the bottom of the chamber to leave a space therebeneath, a differential thermostat having means to measure the inside and outside temperatures and adapted to connect the motor to its source of power at times when the outside temperature reaches a point below the inside temperature to draw the colder air into the chamber thereby lowering the temperature and raise the pressure therein, a low limit thermostat in the power circuit to the motor, said low limit thermostat operating when the outside temperature falls below a safe preserving temperature for the products stored to disconnect the motor from its source of power at a predetermined inside temperature, outlet ports in the wall connecting the space below the floor to the outside, a differential pressure responsive exhaust valve means located in each said outlet port, said valve means being normally closed and constructed and arranged to open in response to a relatively small pressure differential caused by a greater static pressure head within said chamber than outside thereof whereby certain undesirable portions of the atmosphere therein may be exhausted and means holding said valve closed should a greater static pressure head exist outside said chamber than within said chamber, and means to connect the motor directly to its source of power irrespective of the relative temperatures.

FREDERICK P. BIERET.